United States Patent [19]

Nakanishi

[11] Patent Number: 4,705,928
[45] Date of Patent: Nov. 10, 1987

[54] DAMPER DRIVE IN MICROWAVE HEATING APPLIANCE

[75] Inventor: Takao Nakanishi, Nara, Japan

[73] Assignee: Sharp Kabushiki Kaisha, Osaka, Japan

[21] Appl. No.: 16,479

[22] Filed: Feb. 17, 1987

Related U.S. Application Data

[63] Continuation of Ser. No. 823,971, Jan. 30, 1986, abandoned, which is a continuation of Ser. No. 578,643, Feb. 9, 1984, abandoned.

[30] Foreign Application Priority Data

Feb. 16, 1983 [JP] Japan ............................ 58-21773[U]
Feb. 16, 1983 [JP] Japan ............................ 58-21774[U]
Feb. 16, 1983 [JP] Japan ............................ 58-21775[U]

[51] Int. Cl.⁴ ............................................. H05B 6/64
[52] U.S. Cl. ...................... 219/10.55 B; 219/10.55 R; 219/400; 126/285 R; 126/21 A; 236/1 G
[58] Field of Search .................. 219/10.55 B, 10.55 R, 219/10.55 F, 400; 236/1 G, 93 R, 68 R, 101 B; 126/21 A, 285 R; 251/212

[56] References Cited

U.S. PATENT DOCUMENTS

| | | | |
|---|---|---|---|
| 4,131,779 | 12/1979 | Tatsukawa et al. | 219/10.55 R |
| 4,283,006 | 8/1981 | Fedewitz | 236/1 G |
| 4,284,235 | 8/1981 | Diermayer et al. | 236/1 G |
| 4,369,347 | 1/1983 | Shin | 219/10.55 B |
| 4,450,344 | 5/1984 | Sakoda et al. | 219/400 |

Primary Examiner—Philip H. Leung
Attorney, Agent, or Firm—Birch, Stewart, Kolasch & Birch

[57] ABSTRACT

A heating appliance such as a hot-air circulating microwave oven using a shape memory alloy as the damper spring for driving the damper unit. The damper lid a capable of switching the direction of air to be supplied into the heating chamber and the damper spring, made of shape memory alloy drives the damper lid in the air path inside a duct, delivering air cooled by a cooling fan to both the heating chamber and a magnetron.

3 Claims, 7 Drawing Figures

DAMPER DRIVE IN MICROWAVE HEATING APPLIANCE

This application is a continuation of application Ser. No. 823,971 filed on Jan. 30, 1986, which is a continuation of application Ser. No. 578,643 filed on Feb. 9, 1984 both abandoned.

BACKGROUND OF THE INVENTION

The present invention reltes to a heating device of a hot-air circulating microwave oven using a shape memory alloy for the damper driver spring.

When a shape memory alloy mainly composed of either titanium or nickel is heated by directly being connected to the power source, energy is generated to enable the alloy to return to the shape originally memorized. A technique has been proposed or applying such energy to the damper driver spring for opening and closing the ventilation hole provided in the chamber of a hot-air circulating microwave oven.

However, since the shape memory alloy performs the same operation as returning to its original shape by directly receiving the power when peripheral temperature rises, and as a result, being thermally affected by the chamber temperature of a microwave oven, such a shape memory alloy may malfunction to cause the damper to either open or close itself incorrectly. For example, if the damper closes itself while a microwave heating is performed by opening the damper for ventilating cooling air into the chamber, humid vapour generated by food cannot be fully exhausted out of the chamber, causing the chamber door glass to become cloudy.

On the other hand, since the shape memory alloy also moves as the damper moves, if a stationary terminal is set to an end of the shape memory alloy, since tracks of the damper lid that follows the opening and closing movement of the damper and the shape memory alloy spring cannot be identical to each other, a force needed for causing the heated shape memory alloy to return to the originally memorized shape cannot be transmitted to the damper lid sufficiently.

Although both ends of the shape memory alloy spring and the power supply line can be easily installed via terminals by employing caulking means, being affected by the movement of the damper lid, the caulked strength of the terminal lowered. This causes the damper to unreliably perform the opening and closing operations during cooking in a microwave oven via microwave heating or oven heating using a heater.

OBJECTS AND SUMMARY OF THE INVENTION

In the light of such a disadvantageous effect of the damper drive operation, the present invention primarily aims at improving the functional reliability of the shape memory alloy being installed in a heating device, such as a microwave oven, by embodying a means for preventing the shape memory alloy from malfunctioning due to effect of peripheral atmospheric temperature; a means for securely closing the ventilation hole while a hot-air circulation heating is being operated; and a means for securely opening the ventilation hole while a microwave heating is being operated.

Another object of the present invention is to provide a microwave oven with a damper drive device capable of stably operating itself by smoothly transmitting force from a coiled shape memory alloy spring to the damper lid.

A still further object of the present invention is to provide a microwave oven with a ,highly reliable damper by reinforcing the fixed effect of a coiled shape memory alloy spring at both ends via a simple configuration.

To achieve these objects, the present invention characteristically provides a microwave oven with a damper lid that switches the ventilation air entering the chamber and a damper spring made of a coiled shape memory alloy that causes the damper lid to stably move into the ventilation path of the duct sending cool air from the cooling fan to both the chamber and magnetron.

DETAILED DESCRIPTION OF THE INVENTION

Figure 1:
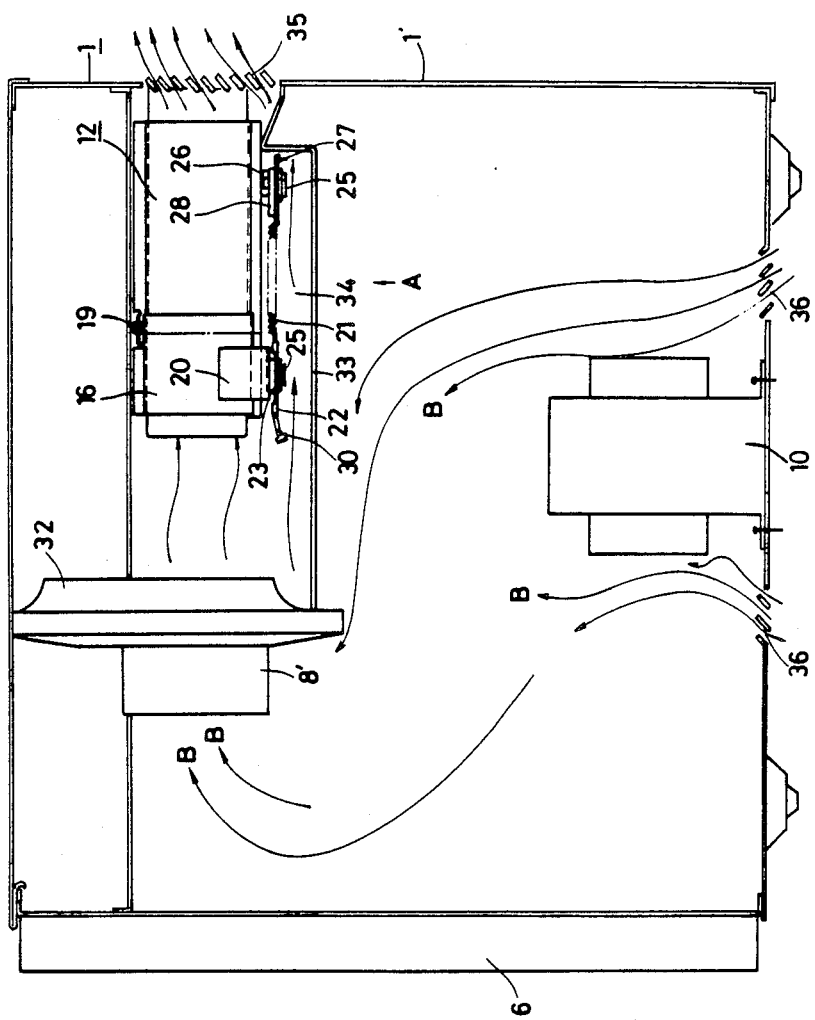
FIGS. 1 and 2 are respectively the simplified sectional views of a hot air circulating microwave oven as a preferred embodiment of the present invention.
Figure 2:
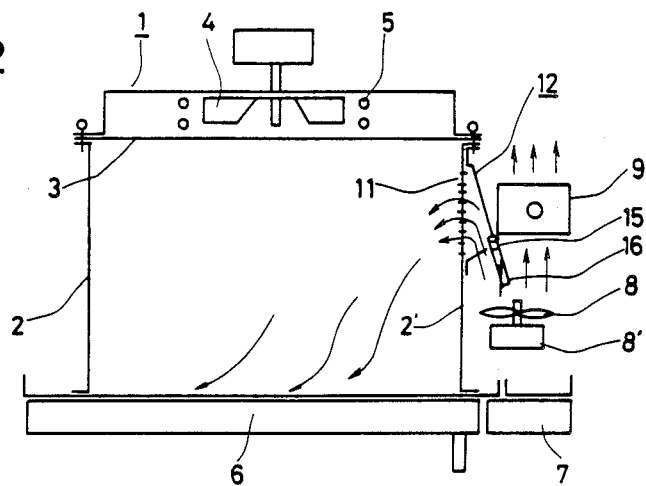

In reference to the drawings attached hereto, a preferred embodiment of the present invention is described below.

A hot-air circulating microwave oven 1 comprises a hot-air circulating fan 4 set to the back side 3 of the heating chamber 2 and a heater 5 set in a position peripheral to the hot-air circulating fan 4. A door 6 is set to the front inlet of the chamber 2. Control panel 7 is equipped with a variety of operational keys. A cooling fan 8 cools electrical parts including the magnetron 9 and transformer 10.

A hole assembly 11 comprises a large number of small holes on the side wall 2' of the heating chamber 2, while the damper unit 12 covering the entire area of ventilation hole assembly 11 is secured to the chamber 2 via the damper screw 13. The damper unit 12 externally forms a triangular column with three sides a, b, and c, and height h. A damper lid 16 is provided in a square opening 14 composed of side a and height h so that the damper lid 16 will move centering the damper shaft 15 in order to open and close the opening 14. A bias spring 19 is set in the direction of opening the inlet 14, at a position between a projected part 17 of the damper lid 16, being set to the damper shaft 15, and the other projected part 18 of the damper unit 12. L-shaped angle 20 is secured to the damper lid 16, in which, a screw hole (not shown) for a step screw 25 being sandwiched by insulation spacers 23 and 24 is provided so that terminals 22, securing an end of the coiled shape memory alloy spring 21 can freely move. An angle 26 is integrated with the damper unit 12, in which, a screw hole (not shown) for a step screw 25 sandwiched by insulation spacers 24 and 28 is provided so that terminal 27, securing the other end of the shape memory alloy spring 21, can freely move. The terminals 22 and 27 are caulked so that the shape memory alloy spring 21 can be fixed electrically and mechanically. An earth (GND) wire 30 and lead wire 29 are respectively connected between terminals 22 and 27 for supplying 3 VAC and 3 A of the power source, while said earth wire 30 is also connected to earth terminal 31 secured to the damper unit 12. The first duct 32 is made of molded resin provided in the external circumference of the damper unit 12. The duct 32 is fixed to the resin-molded second duct 33 that holds and secures both the cooling fan 8 and cooling fan motor 8' integrally and also to the rear board 1' of the hot-air circulating microwave oven 1. An air path 34 is formed by both the first and second ducts 32 and 33. Air passing through this path 34 is led into the chamber via an exhaust loover 35 that is formed in the upper part of the rear board 1'. Although not shown, the lead wire 29 and earth wire 30 are respectively connected to a secondary coil of the cooling fan motor 8'.

Next, operation of the hot-air circulating microwave oven complete with the above configuration is described below. First, when applying the microwave heating, the microwave from the activated magnetron 9 and transformer 10 is radiated into the heating chamber 2. Then, the activated cooling fan 8 will cause cool air being sucked via the air-sucking loover 36 formed around the transformer 10 to be blown into the chamber 2 via an air path 34 and the exhaust loover 35. When the microwave heating is performed, since the lead wire 29 is not connected to the secondary coil (not shown) of the cooling fan motor 8', no current is sent to the shape memory alloy spring 21, and so, it doesn't contain hot temperature and no force is generated. This allows the bias spring 19 to hold the damper lid 16 in the direction to open the inlet 14. As a result, cool air from the inlet 14 enters the chamber 2 via the air inlet hole 11, thus allowing vapour generated by the heated food to enter the heating chamber.

Next, when performing heating with a heater by supplying current to it after inactivating the magnetron 9, since 3 VAC/3 A of the power is sent to the coiled shape memory alloy spring 21 from lead wire 29 and earth wire 30 that are connected in series to a secondary coil (not shown) of the cooling fan motor 8', the shape memory alloy spring 21 is heated up to a specific temperature within a short period of time, and then it quickly returns to the original shape that contain a specific force under a high temperature condition, and as a result, by resisting the elastic force of the bias spring 19, it then causes the damper lid 16 to move in the direction to close itself centering the damper shaft 15. As a result, the air inlet 14 is shut off, and so cooled air is not sent into the chamber 2, and thus the chamber will not be cooled at all. Particularly advantageous is that, by using these means, temperature can quickly and effectively rise immediately after starting the hot-air circulation cooking that compulsorily circulates heat generated by the heater throughout the chamber.

Normally, when a specific temperature is reached after directly feeding power to the shape memory alloy spring 21, it functions as a spring by retaining the original shape memorized. However, even when the power is shut off, by being affected by a thermal effect from other electrical parts, the shape memory alloy spring 21 may slightly return to the original shape, causing the damper lid 16 to move when a microwave heating is being performed and the inlet space to be reduced.

The present invention however provides a damper unit 12 comprising a damper lid 16 and a coiled shape memory alloy spring 21 in the air path 34 encircled by the first and second ducts 32 and 33. When performing a microwave heating in which the damper lid 16 should always remain open, since the cooled air constantly comes into contact with the shape memory alloy spring 21 in the constant condition, the spring 21 can be held in a relatively low temperature range. Consequently, the preferred embodiment of the present invention enables the shape memory alloy spring 21 to remain in a stable condition throughout the microwave heating without causing temperature to rise and generating unwanted force at all.

Figure 3:
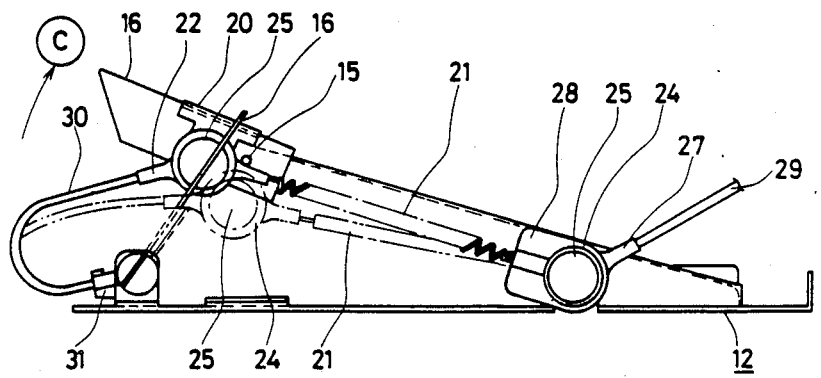
FIG. 3 is a lateral view of a damper unit of FIG. 1.
Figure 5:
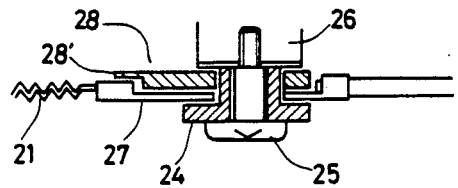
FIG. 5 is a sectional view of the coiled shape memory alloy spring being installed in another preferred embodiment of the present invention.
Figure 4:
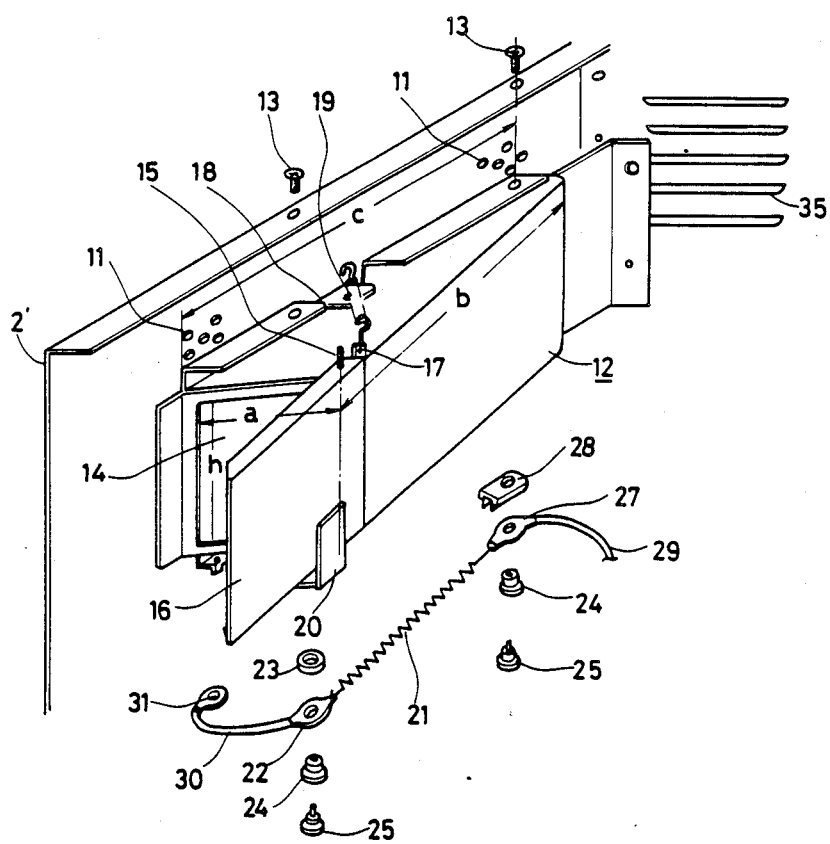
FIG. 4 is an exploded view of the main part of a damper.

Another preferred embodiment of the present invention provides the damper mechanism with a projected rib 28' on the insulation spacer 28 that causes terminal 27 of the coiled shape memory alloy spring 21 and the spacer 28 to simultaneously move. When the damper lid 16 either opens or closes itself, terminal 22 that secures an end of the shape memory alloy spring 21 moves in relation to the moving angle of the damper lid 16 as shown in FIG. 3. However, since the terminal 22 is sandwiched by insulation spacers 23 and 24 and installed via a step screw 25 so that it will freely move, it operates very smoothly, and as a result, even when unwanted force is applied to the shape memory alloy spring 21 and thereby the temperature rises, the spring 21 will not lower its effective force at all.

In addition, terminal 27 securing the other end of the shape memory alloy spring 21 is held by rib 28' on the spacer 28, causing the terminal 27 to move simultaneous with the spacer 28, and as a result, such a mechanism thus embodied by the present invention eliminates any danger of causing the AC current from the terminal 27 in contact with the damper unit 12 via lead wire 29 to be eventually shorted to the earth terminal (GND).

Figure 6:
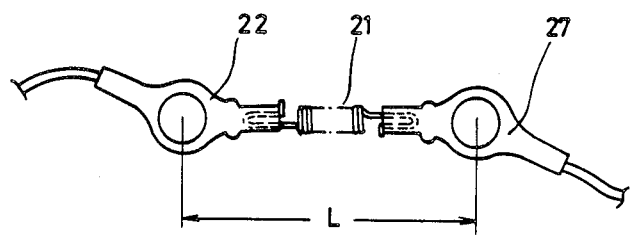
FIG. 6 is a sectional view of the coiled shape memory alloy spring installed in a still further preferred embodiment of the present invention.
Figure 7:
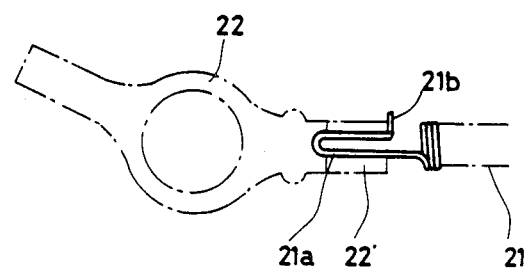
FIG. 7 is an enalrged view of an end portion of the coiled shape memory alloy spring.

In reference to FIGS. 6 and 7, a still further preferred embodiment of the present invention is described below.

The coiled shape memory alloy spring 21 provides the U-shape end part 21a on both sides. This end part 21a is secured to caulking part 22' of terminal 22 via caulking means. A stopper bent 21b is at the tip portion of the end part 21a. Since the stopper 21b is available for positioning when inserting the end part 21a into the caulking portion 22', it provides an advantage for setting a specific distance L between terminals 22 and 27 when securing the coiled shape memory alloy spring 21 to these terminals. In this embodiment, both ends of the shape memory alloy spring 21 are made into U-shape, while both ends are respectively secured to the power supplying terminals via caulking means. As a result, this configuration not only significantly improves the reliability of the opening and closing operations of the damper unit due to effective performance of the shape memory alloy spring 21, but it also stabilizes the caulking strength, since the U-shape caulking corresponds to such an effect as if 2 wires were caulked at the same time. As described above, the preferred embodiments of the present invention internally provide a damper unit equipped with a shape memory alloy spring in the path of cool air that cools electric parts including a magnetron and transformer, and as a result, atmospheric temperature surrounding the shape memory alloy spring will always receive a specific amount of cooling air, and so the temperature will remain lower than the external portion of the air path in a stable condition, thus reliably preventing unexpected failure of the mechanism caused by rising temperature while performing a heating operation. In addition, since both the shape memory alloy spring and the damper lid can be integrally built into the damper unit, performance of the damper itself can be checked as an independent part, eventually providing a valuable convenience for servicing operations.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A heating appliance which utilizes a coiled shape memory alloy spring to regulate a damper which controls ventilation air which enters a heating chamber of said appliance comprising:

a hot-air circulating microwave oven including a heating chamber, ventilation holes for introduction of cooling air into said heating chamber, a damper for controlling said cool ventilation air to be introduced via an air path into said heating chamber during microwave heating, said damper comprising a damper unit covering said ventilation holes, an opening into said unit and a damper lid for opening and closing said opening, a duct system inclusive of said air path housing said damper, and a coiled shape memory alloy damper spring which selectively opens and closes said damper lid during operation of said hot-air circulating microwave oven, said coiled shape memory alloy damper spring being juxtapositioned outside said damper unit within said duct system in the path of said cool ventilation air so as to be cooled to reduce its sensitivity to increases in temperature by virtue of consequential increases in temperature of said heating appliance and be held at a relatively low temperature condition thereby avoiding a residual thermal effect to said shape memory alloy spring.

2. The heating appliance of claim 1, wherein said damper unit further includes terminal means for securing respective ends of said coiled shape memory alloy damper spring, said terminals being sandwiched between insulation spacers and capable of simultaneous and free movement such that even when unwanted force is applied to said shape memory alloy spring it does not lose its effective force.

3. The heating appliance of claim 2, wherein said respective ends of said coiled damper spring are formed in a U-shape and are secured to said terminals for supplying power to said shape memory alloy damper spring via caulking means.

* * * * *